United States Patent [19]

Klaiber et al.

[11] 3,963,879

[45] June 15, 1976

[54] TELEPHONE DIAL ASSEMBLY

[75] Inventors: Gerhart F. Klaiber, Deal; Donald Foggia, Oakhurst, both of N.J.

[73] Assignee: TIE/Communications, Inc., Stamford, Conn.

[22] Filed: July 19, 1974

[21] Appl. No.: 490,076

[52] U.S. Cl. .............................. 179/90 K; 179/2 DP
[51] Int. Cl.² .......................................... H04M 1/50
[58] Field of Search........... 179/90 K, 90 B, 90 AW, 179/90 R, 2 DP; 178/17 A, 17 C; 200/159, 340, 5 R, 5 EA; 235/145, 146

[56] References Cited
UNITED STATES PATENTS

| | | | |
|---|---|---|---|
| 2,958,752 | 11/1960 | Horman | 200/159 A |
| 3,479,470 | 11/1969 | Ham, Jr. | 179/90 R |
| 3,573,376 | 4/1971 | Bartlett et al. | 179/2 DP |
| 3,626,409 | 12/1971 | Hill et al. | 340/365 |
| 3,731,014 | 5/1973 | Brady | 200/159 A |
| 3,760,121 | 9/1973 | Nissim | 179/90 AN |
| 3,865,994 | 2/1975 | Bender | 179/90 K |

*Primary Examiner*—Kathleen H. Claffy
*Assistant Examiner*—Gerald L. Brigance
*Attorney, Agent, or Firm*—Kenyon & Kenyon

[57] ABSTRACT

There is disclosed herein an improved dial assembly suitably adapted to provide an expanded capability for a touch-tone telephone system or to replace existing rotary dial assemblies in various equipment manufacturers' subsets with a touch-tone like assembly. In particular the improved dial assembly includes an upper frame and a pushbutton arrangement similar to known touch-tone dial assemblies. Longitudinal and transverse rods positioned in separate planes immediately below the upper frame convert the downward movement of a particular depressed button into rotational movement. The rotational movement of the rods is utilized by suitably positioned cooperating sets of switches to connect in the necessary manner the various telephone circuits within and/or external to the particular subset. The improved dial assembly above expands the capability of present day assemblies in that it enables the provisioning of ancillary telephone functions, such as repertory dialing, toll restricting circuitry, etc., by the inclusion of an additional plane of switching. This is effected through the incorporation of a "third plane" switching board which contains a plurality of switches which open and close in response to the cooperative action between switches on this "third plane" board and an axial appendage extending downward from each of the buttons. This additional switching capability, together with the utilization of improvements in micro miniaturization of electronic circuits, particularly large scale integration (LSI), results in a dial assembly which enables these additional functions to be packaged in the telephone subset itself.

10 Claims, 10 Drawing Figures

TELEPHONE DIAL ASSEMBLY

FIELD OF THE INVENTION

This invention pertains to improvements in telephone dial assemblies, and particularly to improvements in the so-called touch-tone type dial assembly.

BACKGROUND OF THE INVENTION

The touch-tone style telephone call transmitter is enjoying increased, favorable acceptance by telephone subscribers. Call transmitters employing touch-tone principles are described in numerous patents including U.S. Pat. Nos. 3,109,071, 3,123,676, 3,274,345, 3,316,357 and 3,479,470 — the latter two being based on divisional applications of U.S. Pat. No. 3,274,345. The basic principles of operation of the standard touch-tone unit are set out in the U.S. Pat. No. 3,274,345 at Column I, line 32 through Column II, line 5.

Many of the advantages of the pushbutton type dial assembly are pointed out in U.S. Pat. 3,076,059. An advantage of particular note with regard to the touch-tone assembly is the fact that it provides more efficient use of transmission facilities with the reduction of calling time, as compared with a standard rotary dial, by approximately one-half. The latter attribute is extremely attractive since a material saving in telephone central office common equipment is possible.

A psychological feature of the touch-tone assembly, in this day and age when everyone appears to be in a hurry, is the relative rapidity compared with the rotary dial system with which one can place a call.

Because of this psychological advantage enjoyed by the touch-tone concept, if it were possible to convert the standard rotary dial systems to the touch-tone dial configuration the enhanced marketability of such an item would appear to be significant. The idea would be to remove the present assembly, i.e., the rotary dial assembly, from the standard telephone subset and to place therein a touch-tone like assembly which phychologically speaking appeals to the subscriber in the same manner as an actual touch-tone assembly. Of course, from an operational point of view a conversion must take place, preferably within the touch-tone like assembly which replaces the rotary dial assembly. This conversion hereinafter referred to as outpulsing, permits pushbutton dialing with a suitable loop-disconnect output compatible to the rotary dial output as is well known to those in the telephone art. Because of the difference in the dial times associated with the touch-tone dial and the rotary dial system, it is apparent that a memory device would have to be provided which would store the number as it is dialed and then feed it to the telephone transmission lines in the proper sequence and pulse form.

Given the increased subscriber acceptance of the touch-tone arrangement for telephone subsets, it is recognized that by increasing the ancillary functions that a telephone provides, a telephone equipment supplier can further enhance the marketability of his product. These ancillary functions might include a repertory dial function which can provide electronic storage of up to ten frequently called numbers of 12 or 16 digits each, all of which can be stored, erased or changed by simple keying means employing the telephone buttons. This enables the subset operator to select a particular stored number through proper keying leaving the transmitter itself to "place" that number once it is identified by the subset operator.

An additional function which can be included within the ancillary function area is the so-called "Toll Restrictor" function. Generally, this function is provided, typically, in business office exchange systems where it is desirable to prevent the dialing of area code calls from all but a few selected subsets. It does this by recognizing that an area code call is being dialed, as opposed to the first three numbers of a local exchange. When it detects this occurrence the toll restrictor circuitry is designed to cut off the corresponding subset connection — thus interrupting the call.

Also, functions not directly related to the telephone art but which provide subscriber convenience such as an electronic calculator, are desirable additions.

Until now, the outpulsing function and the various ancillary functions where desired had to be packaged external to a particular telephone subset. The additional packaging costs and logistic problems oftentimes offset the advantages to be gained thereby such that the equipment manufacturer would not contemplate even providing these functions or, if he did, less than enthusiastic customer acceptance was found due to "excessive " cost.

Recent developments in the art of electronic circuit fabrication, particularly microminiturization and more particularly large scale integration (LSI), have added a new dimension to electronic circuit packaging generally. Particularly, it has enabled telephone packaging engineers and designers to contemplate unique packaging techniques whereby the outpulsing and ancillary functions could be provided in a manner where the logistic's problems and cost to the subscriber would be kept at a minimum.

It is a primary object of this invention to provide a dial assembly having a touch-tone like dial face which is expanded to include additional ancillary functions heretofore packaged separate to the basic telephone subset.

It is another object of this invention to provide touch-tone telephone dial assembly which can provide certain ancillary functions and do so within the volume outline of present dial assemblies.

It is yet another object of this invention to provide a touch-tone like dial assembly which can be readily substituted for the standard rotary dial assembly without any modification to standard telephone subsets.

It is still another object of this invention to provide a touch-tone like dial assembly which includes means for providing a plurality of mounting configurations which enable the basic assembly to be utilized in a variety of subset configurations.

It is another object of this invention to provide an additional plane of switching within a telephone subset which expands the potential of heretofore standard systems.

It is a further object of this invention to utilize the latest advances in microcircuit development, including LSI development, with or without the third plane of switching, to expand the number and type of ancillary functions which can be provided within a subset.

SUMMARY OF THE INVENTION

The present invention for an improved touch-tone like dial assembly rather includes in addition to the standard upper frame wherein there is located a plurality of pushbuttons in three columns and four rows in accordance with the standard dial face arrangement, a first and second plane of longitudinal and transverse rods respectively which are retained in appropriate notches cut out in an appendage which is mounted to the upper frame. Each of the longitudinal and transverse rods includes a plurality of appendages which are transverse to the axis of their respective rods and which are located along the length of the rod at positions corresponding to the particular location of one of the pushbuttons. These first set of appendages cooperate with a shoulder on its corresponding button to convert the downward movement of that button to rotational movement of the associated rod. Additionally, there are two other sets of appendages transverse to each of the rods which, respectively, cooperate with first and second sets of switches. On the one hand the first set of the appendages cooperates, directly, with the first set of switches to open and close the contacts associated with a switch identified with a given rod. The second set of appendages cooperates with a slide actuator bar located in a slot which is bound in a switching board positioned below the guide plate -upper frame assembly. The second set of appendages cooperate with the slide actuator bar to cause a linear movement of the actuator bar. Th actuator bar further includes a set of appendages which extend below the switching board and which cause a second set of switches to open or close whenever any of the pushbuttons are depressed. The first and second plane arrangement of longitudinal and transverse rods described above provides an economy in packaging with regard to the implementation of the switching function performed by the first and second set of switches. With this economy and with the packaging of a standard touch-tone oscillator circuit on a board immediately below the switching board just identified, still yet another board employing large scale integration techniques can be piggybacked onto the touch-tone oscillator board thereby providing additional ancillary functions such as repertory dialing, toll restrictor, instant number recall, and others.

In the preferred embodiment the board immediately below the switching board containing the slide actuator bar is modified to provide an additional switching plane (third plane). In this configuration, the additional switching function is performed by a plurality of leaf-spring switches secured to the board and cooperating with an axially extending, hollow projection at the bottom of each of the pushbuttons. Nested within the hollow opening in this appendage is a plunger and coil spring arrangement which on the one hand transmits the downward movement of a given button so that a given contact provided by the leaf-spring switch is opened in response thereto. On the other hand, the coil spring provides the necessary resisting force to return the pushbutton to its at-rest position. This additional switching capability can be employed to provide additional ancillary functions as well as enable packaging of the outpulsing function within the outline of the dial assembly facilitating replacement of the standard rotary dial assembly with a touch-tone like assembly. The ancillary functions and the outpulsing function are preferably contained in an LSI electronic assembly board which can be piggybacked to the board containing the third plane of switching.

The upper frame is adapted to receive a wide assortment of mounting brackets which expand the versatility of the overall dial assembly by enabling it to be inserted in a corresponding variety of different telephone subset configurations.

Other objects, advantages and features of the invention will be apparent from the following detailed description and by referring to the accompanying drawings.

BRIEF DESCRIPTION OF THE DRAWINGS

The drawings illustrate the best mode presently contemplated for carrying out the objects of the invention and its principles, and are not to be construed as restrictions or limitations on its scope. In the drawings:

FIG. 3 is an electrical schematic, depicting how the switches shown in FIG. 2 are employed to connect a touch-tone oscillator circuit to the telephone subset system.

FIG. 6 is a perspective view of the same switching arrangement shown in plan view in FIG. 5.

DESCRIPTION OF THE PREFERRED EMBODIMENT

Figure 1:
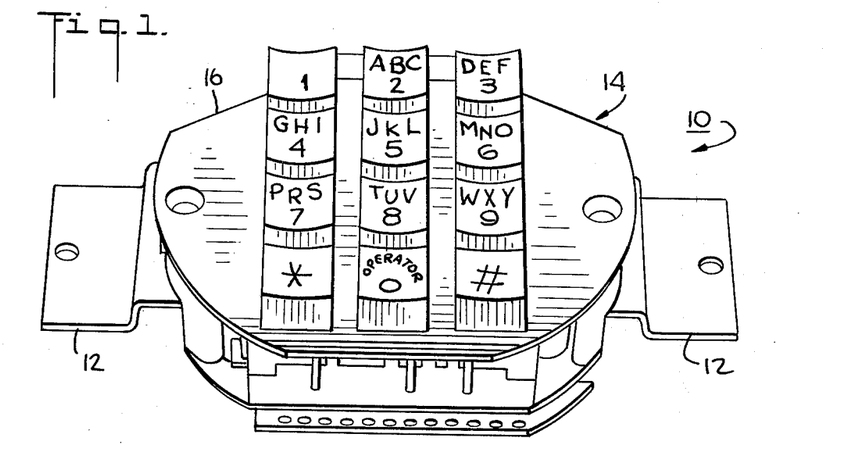
FIG. 1 is a perspective view of the telephone dial assembly of the type described in the invention.

Referring to FIG. 1, an assembled telephone pushbutton dial assembly 10 according to the principles of the present invention is shown. The embodiment of FIG. 1 depicts the use of one particular set of mounting brackets 12 which allow the basic assembly 14 to be mounted in a certain station subset. The basic assembly 14 is contoured about its perimeter 16 to mechanically fit into virtually all station subsets manufactured by the Western Electric Company and other domestic equipment suppliers as well as standard station subset configurations manufactured by various foreign companies. As a result, the entire range of station subsets from a single extension K-500 type to large capacity key telephone systems as well as PABX attendant consoles may be outfitted with this new assembly.

Figure 2:
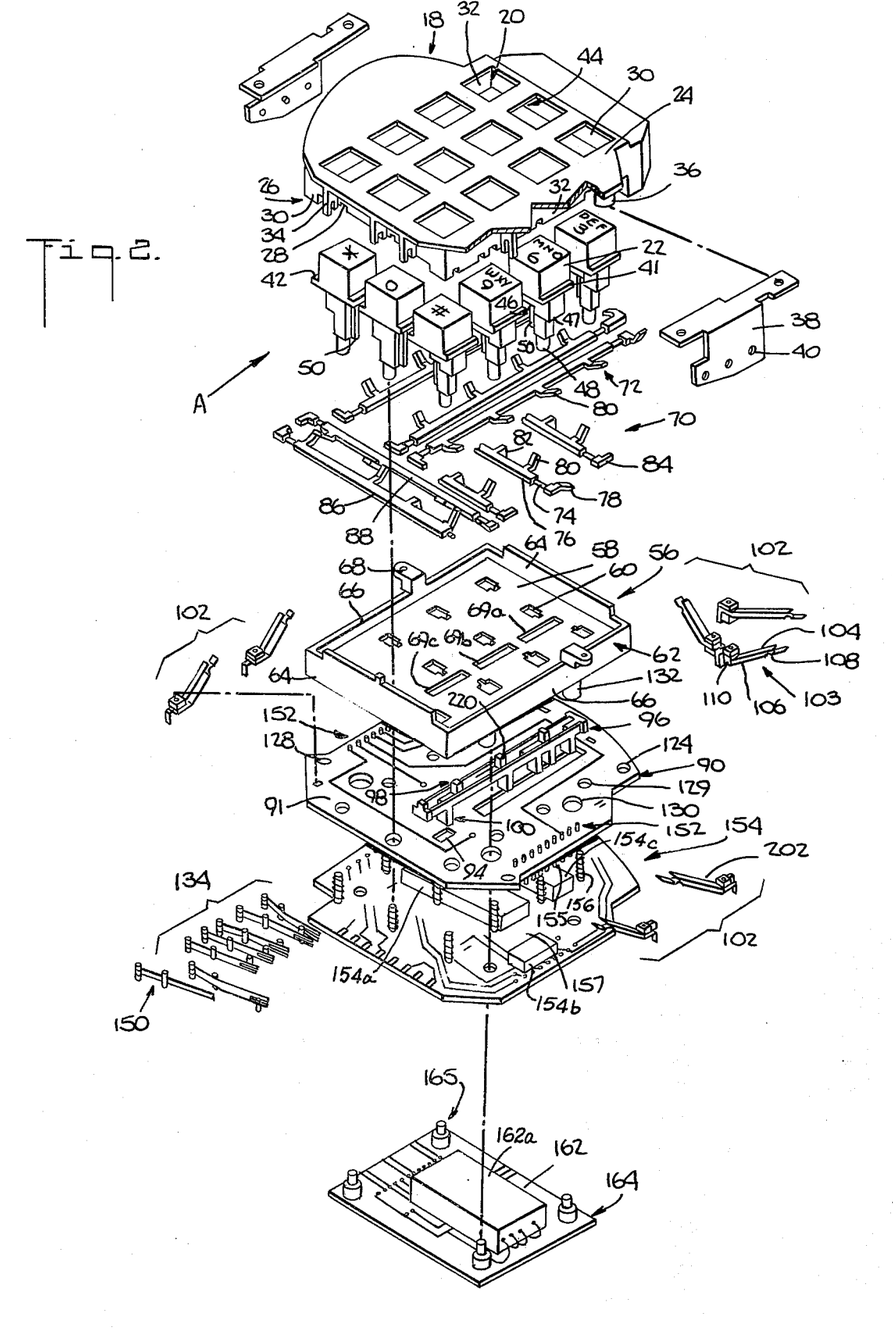
FIG. 2 is an exploded, perspective view of one embodiment of the telephone dial assembly according to the present invention.

Referring to FIG. 2 and the accompanying description following, one can appreciate how the unit of FIG. 1 is assembled. The assembly includes an upper frame 18 which includes a plurality of apertures 20 arranged in four rows and three columns when the number of telephone pushbuttons is 12. The apertures 20 are contoured to allow passage of its corresponding pushbutton shown typically at 22 which for purposes of this discussion is shown rectangular. Preferably, the upper frame is made of a plastic material.

Below the top surface 24 of the frame 18 is a downward extending appendage 26 which for the purposes of this particular embodiment is rectangular in shape. The downward extending appendage includes a plurality of notches 28 about its perimeter. The appendage 26 has two sets of opposing sides which extend downward from the top surface 24 by differing amounts. One side of each set of opposing faces is identified by 30 and 32 respectively in FIG. 2. Also extending downward from the top surface 24 of the frame 18 are fork-like projections shown typically at 34. Their purpose will become evident in the subsequent discussion. Finally, the upper frame 18 includes downward extending bosses 36 to which are secured mounting brackets 38 (or 12 as shown in FIG. 1) via mounting screws (not shown) mounted within appropriately threaded holes inside of the bosses 36. Hole typically shown at 40 would be employed to secure the overall assembly 10 into a suitable mounting position within the telephone subset.

When assembled the telephone pushbuttons would be inserted in the apertures 20 from underneath the upper frame 18 such that the shoulders 41 and 42 on each button would contact the underside 44 of the top surface 24 and thereby be prevented from passing through the aperture in the upper frame 18. The assembly as described includes twelve pushbutton all of the same basic configuration. The 12 buttons include the 0 through 9 buttons familiar to all telephone users as well as * and keys which can be used to key certain ancillary functions described above.

Each button included in addition to the shoulders 41 and 42 additional shoulder 46 and 47 and an axially extending appendage 48. The shoulders 46 and 47 lie in respective planes which preferably are perpendicular to the longitudinal axis of the button and which are at different axial positions for reasons which will become more evident. Finally the buttons include a protrusion 50 which acts as a guiding member restricting the side to side movement of the button when it's depressed in a manner which will soon become evident. There are three columns of buttons, two of which are oriented such that the guiding protrusion 50 extends outward from the button to the right as viewed in the direction of arrow A in FIG. 2, whereas the protrusion 50 associated with the right-hand column of buttons as viewed along the direction of arrow A, extends to the left. The reversal of the one column of buttons allows one common button design to be used in all twelve positions.

Positioned below the upper frame 18 when finally assembled is a guide plate 56 which, preferably, is also made from plastic. The guide plate includes a surface plate 58 which has a plurality of apertures 60 corresponding to the number of pushbuttons and configured to reflect the outline of the portion of the buttons below shoulders 41 and 42, when viewed along the longitudinal axis of the button. Of course, the relative location of each of the apertures 60 on the surface plate 58 correspond to the spacing between the pushbuttons themselves. Extending upward from the surface plate 58 is an appendage 62 which follows the contour of the downward extending appendage 26 of the upper frame 18. The appendage 62 includes a set of opposing faces 64 extending upward at one height from the surface plate 58 and a second set of opposing sides 66 extending upward to a second height. The height of the sets of opposing sides is selected such that when the guide plate 56 is secured to the upper frame 18 the appendage 62 is contiguous with the appendage 26. The appendage 62 includes angled bosses 68 which align themselves with appropriate mounting bosses on the upper frame 18 (not shown) enabling the guide plate 56 to be mechanically secured to the upper frame 18. The guide plate 56 further includes a plurality of slots 69a, b, c, and d (not shown) which allow for cooperative action between certain ones of the appendages on the longitudinal rods and the slide actuator bar as identified hereinafter.

Interposed between the upper frame 18 and the guide plate 56 are a plurality of longitudinal and transverse rods 70 and 72, respectively. These rods typically are zinc die cast. Each of the rods include a cylindrical portion 74 which rests in its corresponding notch 28 when the guide plate is secured to the upper frame. Further, the rods include a generally rectangular shaped portion 76 from which a plurality of appendages, of the type shown typically at 78 and 80, project transversely to the longitudinal axis of each of the rods. The longitudinal rods 70 include an additional appendage 82 whose function will be described later. Lastly, all of the rods include yet another appendage, shown typically at 84, which positions itself in the opening of the fork-like projection 34 when the cylindrical portions 74 of the rods are located in their respective notches 28.

There is one transverse rod for each column of buttons with the right hand rod as viewed in the direction of arrow A oriented such that the appendages typified by 80 extend to the right. The two left most transverse rods as viewed in the direction of arrow A have the projection of appendage typified by 80 extending outward from the rod in the left hand direction. This conforms to the orientation of the three columns of buttons.

There are five longitudinal rods — three such rods aligned respectively with each of the rows corresponding to numbers 1, 2 and 3, row 4, 5 and 6 and 7, 8 and 9 as well as two longitudinal rods 86 and 88 which are acted upon by the buttons identified by , 0, and .
The need for the two rods 86 and 88 to implement the functions performed by a single rod for each of the other three rows is due to the requirement that the dial assembly be insertable in many various subset outlines. In order to fulfill this requirement, applicants had to locate the corresponding switch of the 102 switch grouping, identified below, in such a manner that there was suffficient clearance between the dial assembly and the assembly outline of each subset into which the assembly was to be inserted. This forced an alternate arrangement to the use of a single rod. Rod 88 of the two rod arrangement shown rotationally responds to downward movement of any button in the bottom row with its 78 type appendage operating upon the corresponding one of the 102 switch grouping.

Rod 86 rotationally responds thereto with its 82 type appendage cooperating with slide actuator bar 96 as discussed below.

Likewise the right hand rod, as viewed in the direction of arrow A, of the transverse rod grouping 72 had to be reversed from the other two in order to increase the adaptability of the assembly. This coupled with the desirability of using the same button design for all 12 button positions resulted in the reversal of the rod as well as the column of buttons, 3, 6, 9 and .

The longitudinal and transverse rods 70 and 72 are interposed between the guide plate 56 and the upper frame 18. Because of the difference in height between the first set of opposing sides 64 and the second set of opposing sides 66 of the guide plate 56, the set of transverse rods 72 are positioned in a first plane which is closer to the plane of the top surface 24 than the plane containing the set of longitudinal rods 70. Of course the planes of the rods 70 and 72 are sufficiently separated so that the rods are unimpeded when they rotate in response to movement of the various buttons.

Positioned below the guide plate 56 is a switching board assembly 90. It includes a printed circuit (p.c.) board 91 which is, generally, of a glass phenolic construction having copper paths positioned thereon for purposes of conducting electricity from one location on the board to another. The method for fabricating a p.c. board is well known in the art. The board 90 includes slots 92 and 94 which locate a slide actuator bar 96. The latter is interposed between the switching board and the underside of the guide plate 56. The slide actuator bar 96 generally is arranged such that its longitudinal axis is colinear with the longitudinal axis of the transverse rods 72. The bar 96 includes a first and second set of transverse appendages, 98 and 100, which extend respectively upward through the slot in the guide plate 56 and downward through the slots 92 and 94 in the switching board 90.

The actuator bar 96 preferably is manufactured from a plastic because of the latter's wear characteristics and low coefficient of friction. The first set of transverse appendages, 98, extend upward through the slot in the guide plate 56 and cooperate with the right angle, downward extending appendages 82 associated with each of the longitudinal rods 70 except the one, 88. The cooperative relationship between the appendage 82 and the transverse appendages 98 will be covered later on when a description of the overall operation of the assembly will be discussed.

Positioned on the top side of the switching board assembly 90 is a first set of switches 102. Switch 103 is illustrative of each of the switches in this first set. Each includes a first contact 104, a second contact 106 which includes a semi-circular portion 108 which provides the contact surface between the contacts 104 and 106. Sandwiched between the two contacts is an insulating material 110 which isolates the contact 104 from the contact 106 when the switch is in the rest position. The construction of the switch can better be seen in FIG. 4.

Figure 4:
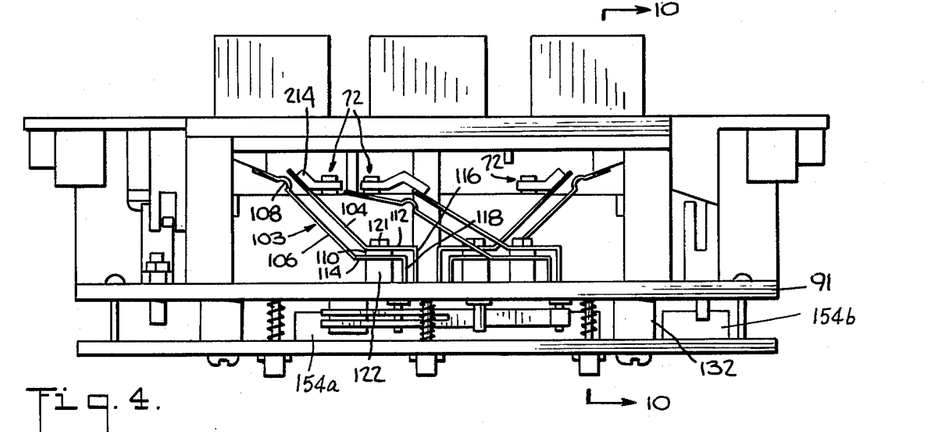
FIG. 4 is an elevational view taken along lines 4—4 in FIG. 8.

Referring to FIG. 4, the contacts 104 and 106, in the final assembly, and this is true of all switches in this set 102, extend upward from the horizontal plane, approximately at a 45° angle. Each contact, 104 and 106 includes a horizontal portion, 112 and 114 respectively, between which insulation material 110 is positioned. The contacts 104 and 106 further include downward extending portions 116 and 118. These latter portions extend through the p.c. board 91 and are soldered to copper paths thereon. The contacts 104 and 106 preferably would be made of gold plated beryllium copper — an optimum material for low current (microamp region) applications which has superior spring properties. In the preferred embodiment the contact 106 would have a forked or bifurcated end as illustrated in FIG. 2. This helps to minimize "contact bounce" — a source of noise which is undesirable in telephone systems.

As noted earlier, the board 91 preferably is a printed circuit board whereupon there is etched various copper paths which make the necessary electrical interconnections in accordance with the overall schematic diagram for the assembly. Some of the printed circuit paths are illustrated in FIG. 6. In that view, it is more readily apparent how the downward extending portions 116 and 118 are connected to corresponding printed circuit paths on the board 91. It is to be recognized that the connections now to be described are typical for each of the switches in the groupings 102. The portions 116 and 118 extend through the board on opposite sides of a rectangular cutout 120. Each of the portions 116 and 118 is then soldered to the printed circuit path which is routed to the corresponding edge of the cutout 120. Thus the necessary electrical connections between the switch contacts 104 and 106 are made to the proper electrical points on the board 91.

Figure 8:
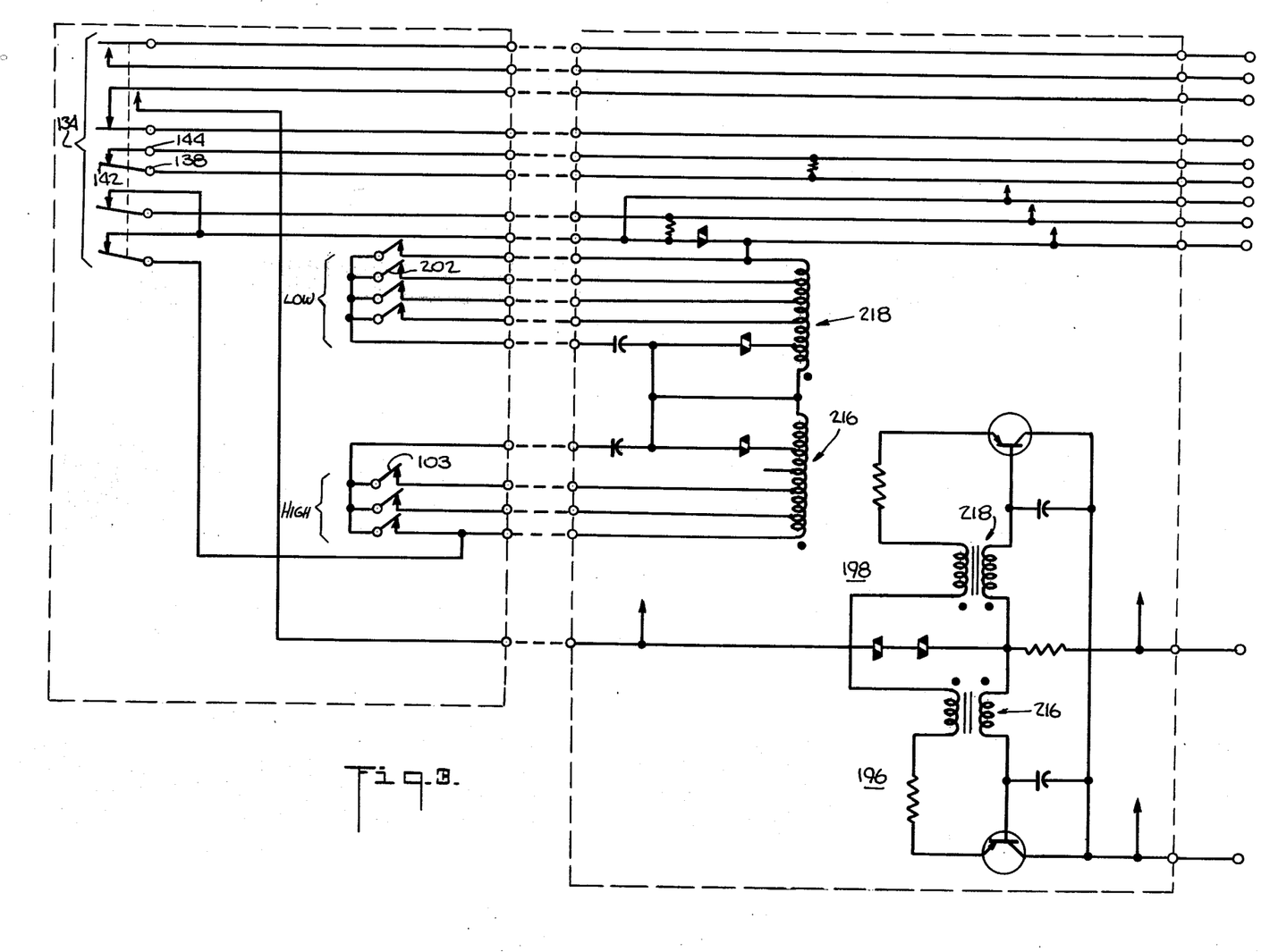
FIG. 8 is a side elevational view of the composite assembly of the invention of FIG. 7.

FIG. 4 best illustrates the mounting of those switches in set 102 which cooperate with the transverse rods 72. FIG. 8 best depicts the mounting of those which cooperate with the longitudinal rods 70. Referring to FIG. 4, a screw 121 is passed through appropriate openings (not shown) in portion 112, insulation material 110, portion 114 and a standoff boss 122. It is then passed through a corresponding opening in p.c. board 91 and secured thereto by a nut (not shown). The boss 122 is required because of the desirability of using the same switch for each location and the fact that the switches which cooperate with the transverse rods 72 must be elevated due to the fact that the plane of the latter is higher than the plane of the longitudinal rods.

In the preferred embodiment there are 7 such switches in the set 102, three of which are responsive to rotational movement of the transverse rods 72 and four of which are responsive to the rotational movement of the longitudinal rods 70.

The printed circuit board 91 includes a plurality of openings therethrough. The circular openings 124, 126 and 128 as well as a fourth opening not apparent in the view FIG. 2 are used to secure the switching board assembly 90 using appropriate mounting means to the upper frame 18. Further, the board 91 includes a plurality of circular openings 129 which align themselves with the axially extending appendage 48 of each of the corresponding pushbuttons 22. Lastly, the board includes appropriate openings 130 to enable passage of mounting bosses 132 which extend downward from the guide plate 56 and which are employed to secure additional electronic assemblies to the basic dial assembly.

Positioned on the back side of the board 91 are a second set of switches 134 whose position and arrangement are best illustrated in FIG. 6. The following discussion will concentrate on the description and operation of but one of the switches which constitutes the set of switches designated 134 in FIG. 2. It is understood, of course, that the remaining switches in the grouping are of identical construction and operate in a similar manner. Switch 136 in the grouping includes a terminal 138 which is suaged or press fitted into the circuit board 91. The terminal typically is made from brass which can be soldered in a conventional manner to a corresponding printed circuit path 141. Tangentially connected to the terminal 138 is a contact strip 142 which preferably is spot welded to the terminal 138 and which extends from terminal 138 across the back side of the board 91. It is routed past a second terminal 143 which is secured to the board 91 in the same fashion as terminal 138. The contact strip 142 extends beyond the point of contact with terminal 143 and tangentially connects with yet another terminal, 144, which is secured to the board 91 in a fashion identical with that of the other terminals. The contact strip 142 is forked or bifurcated at its end 146 which minimizes contact bounce when the switch is opened and closed. The contact strip 142 is of sufficient length that it extends into the path of the transverse appendages 100 which, as noted earlier, extend downward as viewed in FIG. 2 from the actuator bar 96 through the slot 92. The bifurcated end 146 contacts the flat surface 148 of a corresponding one of the appendages 100.

The contact strip 142 is made of spring-like, conductive material such as gold plate, beryllium copper. Terminals 144 are also gold plated to minimize contact resistance. The terminals 138, 143 and 144 are arranged relative to each other such that the strip 142 is spring biased to provide a contact between terminals 138 and 144 when none of the buttons are depressed. The spring bias insures the necessary contact pressure between the strip 142 and the terminal 144. Terminal 143, typically, is nothing more than a pivot point which ensures that the contact strip 142 exerts sufficient pressure against terminal 144 when none of the buttons are depressed.

In addition to the switches which constitute the set 134, there is a spring-like means 150 which operates utilizing the same mechanical principles as employed by each of the switches in the set 134 but whose function it is to insure the repositioning of the actuator bar 96 in its normal, at-rest position once a particularly selected button is no longer depressed. In order to maximize this restoring force, the corresponding "contact strip" for means 150 does not employ a bifurcated end.

Referring again to FIG. 2, (and FIG. 6), there is shown inserted at appropriate locations on the board 91, preferably along the edge thereof, means 152 for electrically connecting corresponding printed circuit paths on the switching board 92 and the electronic assembly board 154. The means for interconnecting the two assemblies 90 and 154, in the preferred embodiment, would include a plurality of pins 155 which would be soldered to appropriate printed circuit paths on the board 91 on the one end and on the board portion of assembly 154 at the other.

The electronic assembly 154 is similar to the board 90 in that it likewise includes a printed circuit board fabricated in the same manner that the board 90 is fabricated. The assembly would include such items as the standard L-C touch-tone oscillator circuits which are shown schematically in FIG. 3. Such an L-C circuit or multi-frequency signal generator for the call transmitter is depicted in FIG. 2b of U.S. Pat. No. 3,479,470. In some of the more advanced adaptions of the basic assembly of the present invention, the electronic assembly board 154 can include a micro-circuit version of the conventional touch-tone oscillator circuit plus additional circuits such as the repertory function earlier described, or a calculator or whatever might be easily packaged within the outline of the assembly 154 as it fits into the overall telephone subset. Such circuits would be implemented by components 154a, 154b, 154c, inter alia.

Figure 10:
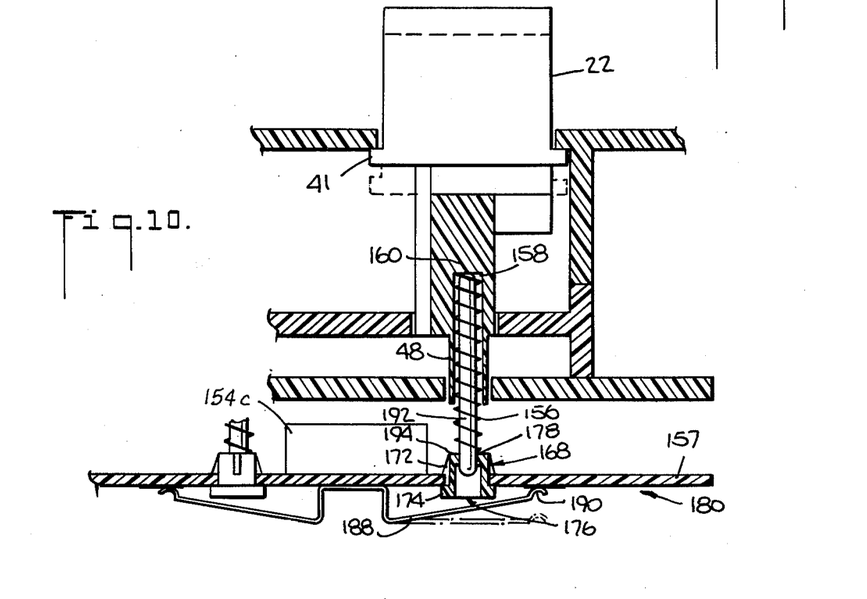
FIG. 10 is a sectional, elevation view depicting the operation of a portion of the embodiment according to FIG. 7.

Interposed between the switching board 90 and the electronic assembly 154, when assembled, are a plurality of coil springs 156 which align themselves with the axially appendage 48 of a corresponding pushbutton. Although FIG. 10 pertains more specifically to the next embodiment to be described, it can be referred to for purposes of understanding how the spring 156 cooperates with its particular button to provide a restoring force which returns the button to its rest position after being depressed. As employed in the FIG. 2 embodiment, the bottom end of the coil spring 156, as viewed in FIG. 10, would contact the top side of the p.c. board 157 used in the assembly 154. The coil spring extends up into a hollow cavity 158 within the axially extending appendage 48 and cooperates with the top end of the cavity 160 to exert an upward force thereon in response to the depression of the button. In the embodiment of FIG. 2, the plunger which is shown positioned within or internal to the coil spring 156 in FIG. 10, is not required.

Where it is desirable to include an additional ancillary function, another electronic assembly 162 can be "piggybacked" onto the underside of the assembly 154. The assembly 162 would include basically a printed circuit board 164 similar in construction to the boards 91 and 157, which would have packaged thereon, the LSI chip embodying certain ones of the ancillary functions mentioned above. The LSI chip would be packaged within a housing such as 162a. Suitable interconnecting means, of a type similar to 152, would be employed to electrically connect the assembly 154 to the assembly 162. Mechanically, the unit 162 can be secured to the mounting bosses 132 on the guide plate 56 through suitable means 165. In the embodiment of FIG. 2 those functions which can be included in the LSI chip to be packaged on the assembly 162 would be limited to those which did not require any additional switching functions other than those performed by the first and second sets of switches, 102 and 134.

The finished assembly would include system hook-up means which would provide electrical connections between the switches and electronic circuits of the dial assembly 10 to the remainder of the telephone system. These hook-up means are not illustrated in FIG. 2 but would generally consist of suitable hook-up wire soldered to appropriate points on the p.c. boards 157 and 164.

Figure 7:
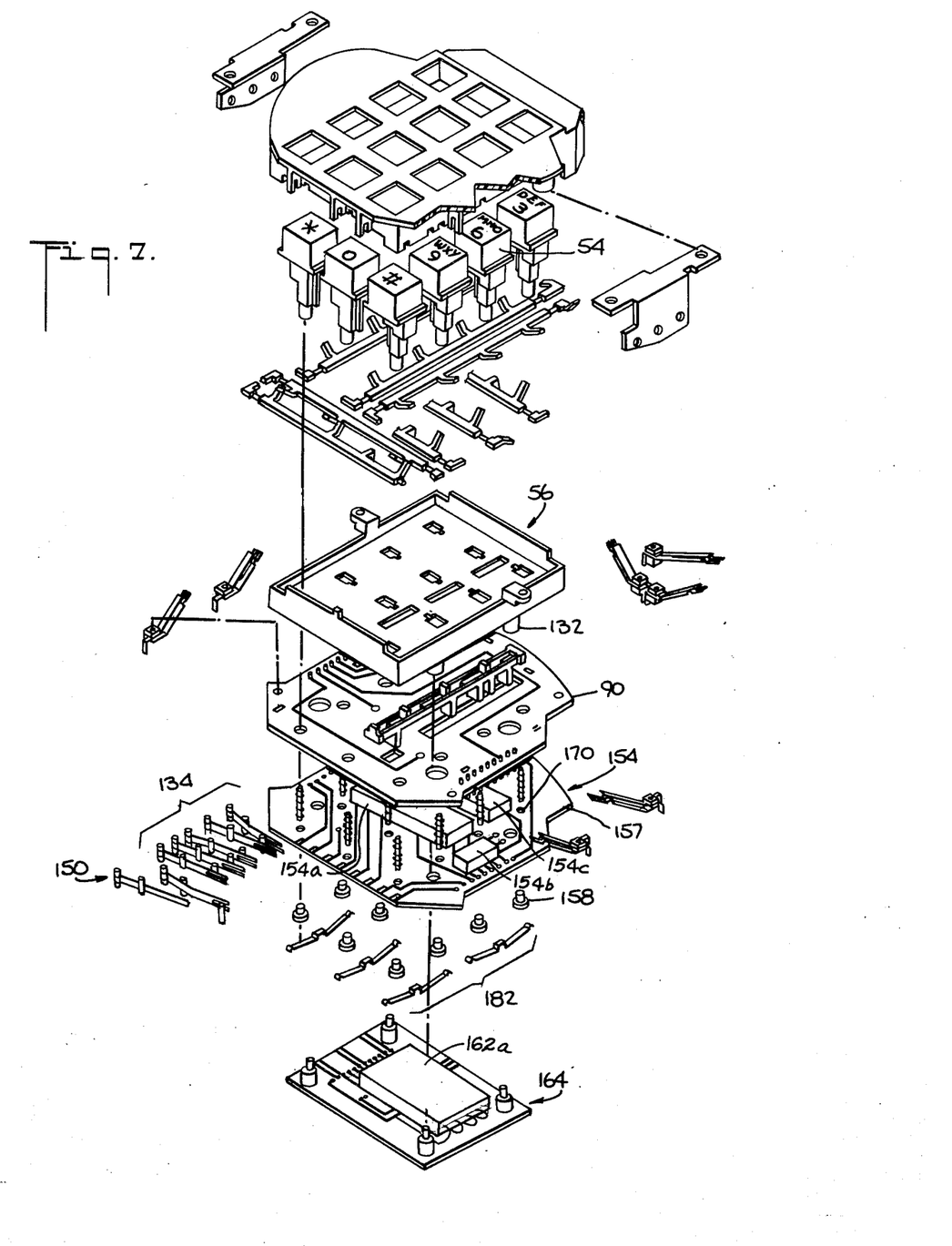
FIG. 7 is an exploded, perspective view of another embodiment according to the invention.

Referring to FIG. 7, there is shown a preferred embodiment which expands the number of available switching contacts and which, consequently, enables the inclusion of additional ancillary functions as part of the electronic assemblies 154 and 164. The construction of the dial assembly from the frame 18 and through the second set of switches 134 positioned on the back side of switching board 90 is identical to the construction expounded upon with regard to FIG. 2. FIG. 7 depicts an extension of the basic design which is most readily understood by studying FIGS. 7, 8, 9 and 10.

In the embodiment of FIG. 7, the assembly 154 includes a printed circuit board which is substantially identical to its counterpart in FIG. 2. Here however, as can be best seen in FIG. 10, provision is made to enable a plurality of bushings 168 to be inserted in corresponding holes 170 in the p.c. board 157. These are aligned with a corresponding one of the axially extending appendages 48. The bushings can be press fitted from the underside of board 156. They lock themselves into place by means of resilient flange 172 which returns to a rest position, once through the board, such that the shoulder of the flange 172 in contact with the top side of the board 157 prevents the bushing from backing out. The bushing 158 further includes a circular flange 174 axially disposed from the flange 172 such that the spacing between the underside of flange 172 and the top side of flange 174 is approximately equal to the thickness of the p.c. board 157. This consequently reduces the up-down movement of the bushings in the holes 170.

The bushing has an opening 176 which reduces down to a small circular opening 178 at the top side of the bushing. The bushing itself is made out of a pliable material such as plastic which would allow it to be pressed through the p.c. board 157 as described above.

Positioned on the underside 180 of p.c. board 157 is a plurality of leaf-spring switches 182. These switches, like the previously described sets of switches 102 and 134, are fabricated from a material such as gold plated, beryllium copper which minimizes the resistance between the contact portions of the switches and the printed circuit lands or paths which are located on the underside 180 of p.c. board 157.

Figure 9:
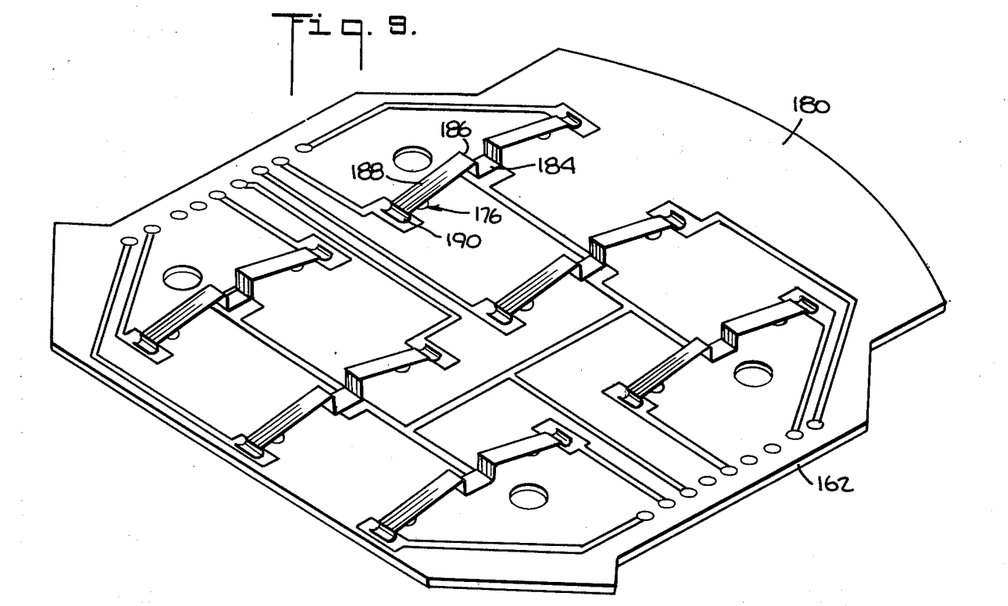
FIG. 9 is a perspective view of the bottom of a switching board used in the embodiment of FIG. 7.

Referring to FIGS. 8 and 9, each of the leaf-spring switches includes a flat portion 184 which can be riveted or soldered to the p.c. board 157 in a manner suitable to insure an electrical connection between the portion 184 and the printed circuit path which runs underneath the portion 184. Each leaf-spring switch further includes a side portion 186 which is essentially perpendicular to the flange portion 184 and which extends downward, as viewed in FIG. 8, from the plane of the board 157. The switches further include a portion 188 which extends back from the extremity of downward extending portion 186 towards the underside 180 of the p.c. board 157. These portions 188 terminate in an arc-shaped section 190 which is so configured to maximize the contact surface between each of the leaf-spring switches and the printed circuit paths positioned below the section 190. The switch is fabricated such that the arc-shaped portion 190 is spring biased against the printed circuit path thereunder when the buttons are not depressed. This further ensures good electrical contact.

Returning to FIG. 10, the spring switches are positioned on the p.c. board 157 such that the opening 176 of bushings 168 is opposite the portion 188 of the corresponding switch.

In the embodiment shown in FIGS. 7 through 10, there is inserted within the coil spring 156 a cylindrical plunger 192. The coil spring 156 is supported at the bottom thereof by the top 194 of the bushing. Referring to FIG. 10, it is seen that the plunger 192 is of sufficient length that it contacts the topside 160 of the cavity 158 on the one end. It is aligned by the narrow opening 178 to be positioned over the portion 188 and contacts the latter when its corresponding button is depressed. The plunger is of sufficiently low mass that it is free-floating and responds to movement of the button or portion 188 of the leaf spring.

As is the case with the embodiment of FIG. 2, the embodiment of FIG. 7 is adaptable to provide for the mounting of an additional electronic assembly 164 to the mounting bosses 132 on the guide plate 156. Because of the additional switching provided by the leaf-spring switches, the ancillary functions that can be packaged on the assembly 164 can be different than those packaged on the similar assembly associated with the embodiment of FIG. 2. They can include the repertory dial function, the toll restrictor function. Where the assembly is used to replace the standard rotary dial assembly, the outpulsor function previously described can be part of the LSI chip which is mounted on the p.c. board 162.

The operation of each of the embodiments will now be described.

The first part of the discussion will concentrate on describing how respective switches in the set 102 respond to the depression of corresponding buttons. As noted earlier there are seven such switches for the three column and four row arrangement depicted. Thus there is one switch in the grouping 102 for each row and each column. The requirement of seven switches of the type identified generally by 102, is particularly necessary where the electronic assembly packaged on assembly 154 includes the touch-tone oscillator circuit.

The schematic of FIG. 3 represents just such an oscillator circuit which generates, simultaneously, a high and a low frequency in oscillator circuits 196 and 198, respectively. As is well known in the art, there is a unique pair of frequencies generated for each of the buttons, 0 through 9 when the particular button is depressed. For purposes of illustration consider the operation of switches 103 and 202 which are two of the seven switches which comprise the set 102. In order to better understand the following discussion the reader should refer to FIGS. 2, 3, 4 and 8.

Of necessity, the description of how the operation of switches 103 and 202 ties in with the generation of the unique oscillator frequencies will be tied in with a discussion of how the depressed button causes its respective longitudinal and transverse rods to rotate.

The parts of the switch 103 were labeled during the prior discussion of the construction of the dial assembly. For purposes of facilitating the following discussion, the switch 202 includes a first contact 204, the end of which, 206, rests under appropriately shaped boss 208 which is part of the upper frame 18. Further, the switch includes a second contact 210 which contacts the downward extending appendage 78 of one of the longitudinal rods 70. As shown in FIG. 8, the buttons are in an at-rest position. The boss 208 cooperates with the first contact 204 which is spring biased thereagainst to insure that the contacting surface between contact 210 and the semi-circular portion 212 of the first contact 204 are maintained in an open condition when button 54 is in the at-rest position.

When the button 22, which as can be seen from FIG. 2 corresponds to the number 6, is depressed, shoulder 46 on the one hand moves downward contacting the upward extending appendage 80 on the corresponding transverse rod in grouping 72. Shoulder 47 contacts the appendage 80 on the corresponding longitudinal rod in grouping 70. These rods consequently rotate about their respective tubular portions 74 positioned in their corresponding notch 28.

Referring particularly to the corresponding longitudinal rod, as it rotates, the appendage 78 turns downward forcing the second contact 210 downward to touch the semi-circular contacting portion 212 of the first contact 204. The switch 202 has thus gone from an open to a closed position. Similarly, the transverse rod in the grouping 72 responds in much the same manner so that upon rotation, the flange 214 forces the first contact 104 down towards the semi-circular contacting portion 108, thus closing the second switch. Thus it is when anyone of the buttons are depressed. However, a careful study of the figures, particularly FIG. 2 and FIGS. 4 and 8 will show that for any particular button, a unique pair of switches will be actuated.

When the finger is removed from the button, the spring-restoring force inherent in each of the contacts 104 and 210 exerts an upward force on the appendages 214 and 78, respectively, returning the corresponding transverse and longitudinal rods to their at-rest position. If one now refers to FIG. 3, it can be seen that the closing of switches 103 and 202 result in the selection of particular taps on the secondary of transformers 216 and 218, respectively. These particular taps, along with the other components in the oscillator circuits 196 and 198, are selected in accordance with principles well known to those skilled in the oscillator design art, to generate two frequencies, corresponding to the standard frequencies employed in touch-tone systems, which represent the numeral or digit 6.

Figure 5:
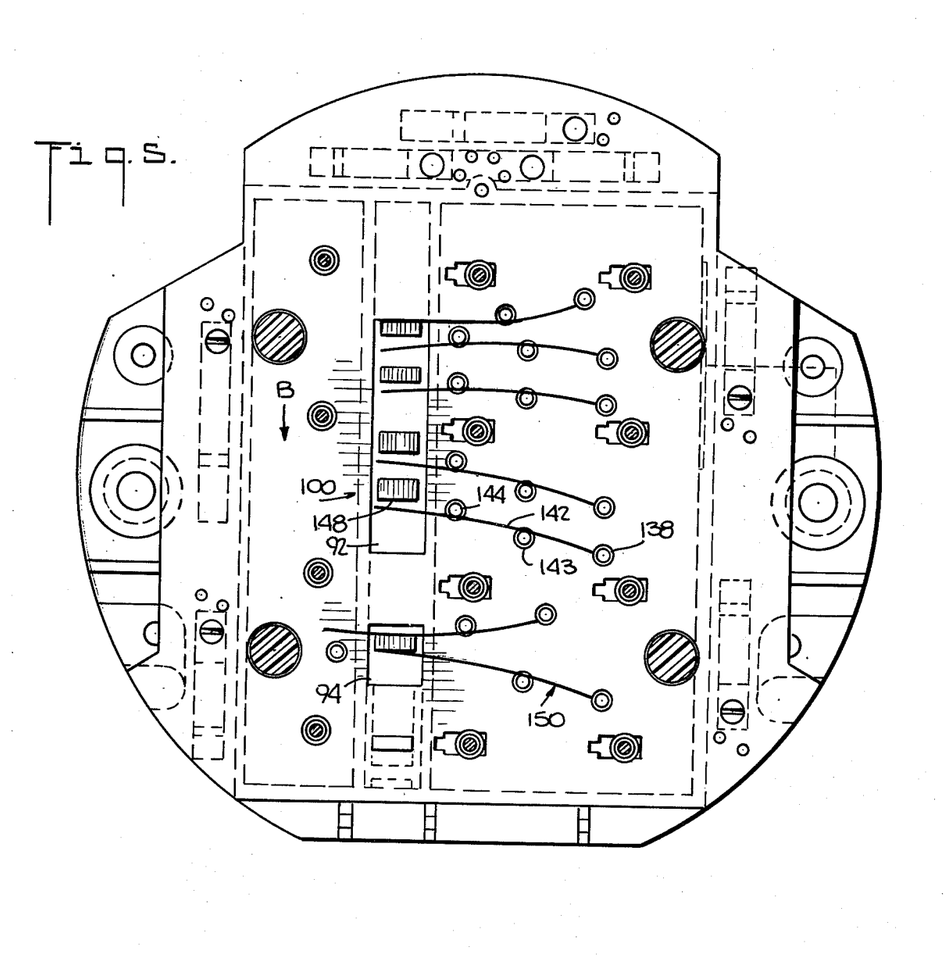
FIG. 5 is a plan view used to describe the switching operation in accordance with a part of the invention.

Referring to FIGS. 2, 5 and 6, the actuation of the switches in the set 134 will next be described. All of these switches in the group 134 are activated whenever any button is depressed. Thus they are available to be used in any telephone circuits, well known to those in the telephone systems art, which must respond whenever any button is pushed.

For example, when the button 22 is depressed and the longitudinal rod corresponding to that button is caused to rotate due to the cooperative action between the upper extending appendage 80 and the shoulder 47, the downward extending appendage 82 rotates and in so doing contacts the transverse appendage 220 on actuator bar 96. This can be best seen in FIG. 2. This results in the slide actuator bar moving in a linear fashion, direction B in FIG. 5, in the slots 92 and 94. The various transverse appendages identified generally as 100, of course, move in the same direction, B. Typically, the flat surface 148 of the various appendages contact the strip 142 after movement of a minimum amount. The contact between strip 142 and the terminal 144 is broken, thus interrupting the electrical connection between terminal 138 and terminal 144.

The grouping 134 is identified in the schematic FIG. 3 with the particular switch formed by terminals 138, 144 and strip 142, particularly identified. The switch positions shown would be those which exist when the buttons are in the at-rest position.

As noted earlier, spring-like means 150, preferably, is made of a strip similar to contact strip 142 but which generally is not bifurcated. This increases its restoring force capability. It exerts this force through one of the second sets of appendages, 100, to the actuator bar 96 so that the latter is returned to its at-rest position when the operator's finger is removed from the button.

The "third plane" of switching which expands the potential of the previously described assembly of FIG. 2, will now be described with reference particularly to FIGS. 7, 9 and 10. Referring to FIG. 10, when the button 22 is depressed, the top side of cavity 160 contacts the upper end of plunger 192. The latter is forced downward through the narrow opening 178, through the opening 176 until the plunger contacts the board-facing side of portion 188 of the corresponding leaf-spring switch, forcing the latter downward as viewed in FIG. 10. This interrupts the electrical connection formed between the arc-shaped portion 190 and the printed circuit path positioned thereunder. Thus the electrical connection between the printed circuit path under the portion 184 of the leaf-spring switch shown and the electrical printed circuit path under the portion 190 is opened.

When the button is depressed, the coil spring 156 which has a diameter larger than the opening 178, becomes coiled against the top of the bushing 194. When the operator's finger is removed from the button 22, the restoring force built up in the coil spring 156 is exerted against the top of the cavity 160. This forces the button 22 upward until the shoulder 41 contacts the underside of the top surface 24 of the flange 18.

Once the top side of the cavity 160 is freed from the corresponding end of a plunger 192, the restoring force in the spring contact portion 188 exerts itself on the bottom end of the plunger 192 forcing it upward until the arc-shaped portion 190 again comes in contact with its corresponding printed circuit path.

Thus through the improved embodiment shown in FIG. 7, an additional plane of switching, providing twelve additional switching functions which open and close in response to a corresponding digit being depressed, is provided. Through application of suitable voltage levels on the various printed circuit paths contacting the plurality of portions 184 and 190, digital logic levels can be generated indicative of the open or closed position of the corresponding leaf-spring switch. These logic levels can be interrogated by suitable logic circuitry so that the particular digit depressed can be identified. It is obvious to those skilled in the logic design art how this information could be utilized to provide additional ancillary functions and particularly those enumerated above.

The implementation of these additional ancillary functions given the increased number of switching contacts provided by the third plane of switching and the advancement in the state of micro-circuit development, particularly large-scale integration, would be obvious to those skilled in digital circuit and logic design.

In certain situations it may be desirable to delay the time when the switching functions performed by the first and second sets of switches, 102 and 134 are operated and when the functions implemented by the third plane of switches are performed. This time can be adjusted by judicious design of the relative spacing between the shoulders 46 and 47, and the length of the hollow cavity 158 internal to the axially extending portion 48.

It is to be appreciated that changes in the above embodiments can be made without departing from the scope of the present invention. These changes would be apparent to those skilled in the art but must be considered within the scope of the invention as defined in the appended claims.

What is claimed is:

1. A telephone pushbutton dial assembly which comprises:
   a. an upper frame including a plurality of apertures arranged in rows and columns and further including a downwardly extending appendage having a plurality of notches and its perimeter;
   b. a pushbutton mounted for movement in each aperture, each of said pushbuttons including a plurality of shoulder portions and a singular axially extending appendage;
   c. a guide plate including an appendage having the same perimeter as said upper frame appendage and including means for mounting said plate to said upper frame;
   d. a plurality of longitudinal and transverse rods, rotatably mounted in a first and second plane, respectively, between corresponding opposite ones of said notches and retained in said notches when said guide plate is mounted to said upper frame, each of said rods including a plurality of appendages transverse to the longitudinal axis of their respective rod, certain ones of said appendages adapted to cause rotational movement of its associated rod through cooperative action with said shoulder portions of corresponding ones of said buttons;
e. first switching means, including a first switching board having at least a first set of switches mounted thereon cooperating with certain other of said appendages and adapted to make or break in response to the rotational movement of the rods; and
f. second switching means including,
   i. a second switching board positioned in a plane parallel to and below the plane of said first switching board, said first and second switching boards having a plurality of corresponding openings each aligned with a corresponding one of said axially extending appendages,
   ii. a plurality of leaf-spring switches fixedly secured to said second switching board, each of said leaf-spring switches aligned with a corresponding one of said axially extending appendages, each of said leaf-spring switches making an electrical connection between two points of electrical potential on said board, and
   iii. means aligned with each of said axially extending appendages and its corresponding openings in said first and second board, and operatively connected between said appendage and its corresponding leaf-spring switch, whereby said electrical connection is broken when the corresponding push-button is depressed.

2. The dial assembly of claim 1 further comprising means for mounting said dial assembly into a plurality of different telephone assembly configurations.

3. The dial assembly of claim 1 where the axially extending appendage of a corresponding pushbutton has a predetermined length dependent on the time interval desired between when said first switching means responds to said rotational movement and when said second switching means responds to movement of said corresponding pushbutton.

4. The dial assembly of claim 1 further comprising electronic assembly means, including at least one electronic circuit, said electronic assembly contoured and mounted to said dial assembly of claim 1 in a manner that said dial assembly can be installed in a plurality of different telephone assembly configurations, said electronic circuits electrically connected through either of said first and second switching means to telephone circuits mounted in the telephone assembly or outside thereof.

5. The dial assembly of claim 4 where said first switching board further includes:
a. a slide actuator bar mounted in a slot in said first switching board, said bar including a first and second set of transverse appendages, said first set cooperating with certain ones of said appendages affixed to said longitudinal rods to convert said rotational movement of said longitudinal rod to linear movement of said bar; and
b. a second set of switches positioned on the back side of said first switching board and adapted to be responsive to said second set of transverse appendages on said bar when said bar is moved linearly.

6. The dial assembly of claim 5 where said first and second sets of switches are comprised of switches wherein at least one contact of each switch is bifurcated.

7. The dial assembly of claim 5 where each of said axially extending appendages is hollow and where said second switching means includes:
a. a plurality of plungers each positioned within a corresponding coil spring having a predetermined spring constant; and
b. means for nesting said spring and its associated plunger within a corresponding hollow.

8. The dial assembly of claim 7 where said electronic assembly means is mounted on the back side of said second switching board.

9. The dial assembly of claim 7 where said second switching board also includes thereon at least one other type of electronic circuit which is electrically connected through said first and second switching means to telephone circuits mounted in the telephone assembly or outside thereof.

10. The dial assembly of claim 7 where one end of at least two of said leaf-springs are connected to the same point of electrical potential.

* * * * *

UNITED STATES PATENT AND TRADEMARK OFFICE
CERTIFICATE OF CORRECTION

PATENT NO. : 3,963,879
DATED : June 15, 1976
INVENTOR(S) : Gerhart F. Klaiber and Donald Foggia It is certified that error appears in the above-identified patent and that said Letters Patent are hereby corrected as shown below:

Change "touch-tone" to --TOUCH-TONE-- at the following locations:

Lines 3, 5 and 8.

Column 1, lines 7, 10,12,17,18,22,23,29,34,35,36,41,43,45,50,51, 58.

Column 2, lines 37, 41,42, 46, 50, and 65.

Column 3, lines 35, 39, and 61.

Column 4, line 20.

Column 9, line 46.

Column 2, line 27 - correct spelling of "microminiaturization--

Column 2, line 41 - insert "a" between "provide" and "TOUCH-TONE".

Column 3, line 25 - correct spelling of "The".

Column 5, line 26 - between "and" and "keys" insert --"#"--.

Column 6, line 37 - between "by" and "0" insert --"*"-- between "and" and "." insert --"#"--.

Column 6, line 45 - correct spelling of "sufficient".

Column 6, line 62 - between "and" and "." insert --"#"--.

UNITED STATES PATENT AND TRADEMARK OFFICE
CERTIFICATE OF CORRECTION

PATENT NO. : 3,963,879
DATED : June 15, 1976
INVENTOR(S) : Gerhart F. Klaiber and Donald Foggia It is certified that error appears in the above–identified patent and that said Letters Patent are hereby corrected as shown below:

Column 9, line 9 - change "plate" to --plated--.

In the Claims:

Column 15, line 10 - change "the rods" to --said rods--.

Signed and Sealed this

Twelfth Day of October 1976

[SEAL]

Attest:

RUTH C. MASON
Attesting Officer

C. MARSHALL DANN
Commissioner of Patents and Trademarks